July 4, 1961 L. K. BEACH 2,991,302
PURIFICATION OF ISOPROPYL METHYLPHOSPHONOFLUORIDATE
Filed May 27, 1958
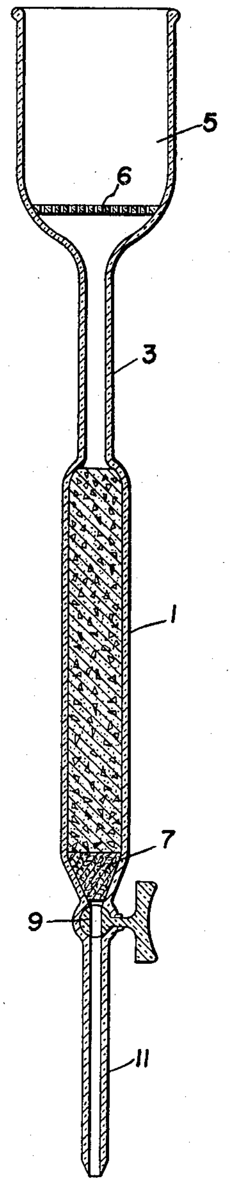
INVENTOR.
Leland K. Beach
BY George Rowland [signature]
ATTORNEY United States Patent Office 2,991,302

Patented July 4, 1961

2,991,302

PURIFICATION OF ISOPROPYL METHYLPHOSPHONOFLUORIDATE

Leland K. Beach, Sunbury on Thames, Middlesex, England, assignor to the United States of America as represented by the Secretary of the Army Filed May 27, 1958, Ser. No. 738,241

6 Claims. (Cl. 260—461)

This invention relates to a method of separating isopropyl methylphosphonofluoridate from impurities, present in the crude product, particularly from acidic impurities and diisopropyl pyromethylphosphonate.

The drawing is a diagrammatic view, in section, of laboratory apparatus for carrying out the process on an analytical scale.

Isopropyl methylphosphonofluoridate,

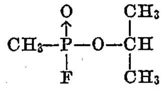

also known as "sarin" and "GB" is an important toxic chemical warfare agent. As prepared by the usual synthesis, the crude product contains various impurities which are acidic in character and also diisopropyl pyromethylphosphonate,

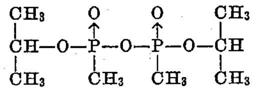

commonly called by workers in the art "pyrodiester." Among the acids commonly present are hydrogen chloride, hydrogen fluoride, methyl-phosphonic acid and other organic phosphorus-containing acids. It is desirable to remove these imprities in order to purify and stabilize the GB and also as an aid in analysis. Removal of the pyrodiester is particularly desirable for the latter purpose, since it interferes in the determination of GB by the usual methods.

I have found that a quantitative separation may be made by introducing the crude GB into a column of water-saturated silica gel and eluting the column with a suitable solvent, an unsubstituted dialkyl ether having from 4 to 8 carbon atoms being preferred. The most satisfactory solvent that I have found is diisopropyl ether. Di-n-propyl and the various butyl ethers may also be used. Diethyl ether may also be employed but is less selective than diisopropyl ether and is less desirable because of its higher volatility. The process is ordinarily carried out at room temperature but lower temperatures may be used. The GB is recovered in the solvent, while the impurities remain in the column for which they are removed by washing with water. The column is then ready for the next batch of crude product.

An apparatus for use in carrying out the process on an analytical scale is shown in the drawing. It is basically a glass column having an adsorbing section 1 about five inches long, having a volume of 25 cc. and filled with silica gel of minus 28 mesh. Above the adsorbing section is a 2½ in. constriction 3 and 175 cc. reservoir 5 in which a perforated plate 6 may be placed. Below the adsorbing section is a sintered glass plate or glass wool packing 7, a stop cock 9 and a capillary tip 11.

The procedure is carried out as follows.

A. PREPARATION OF WET-GEL COLUMN

About 30 cc. of dry silica gel, 28–200 mesh is slowly poured into 200 cc. of distilled water with stirring. The mixture is vigorously mixed and the fines decanted. (Elimination of the fines is necessary to give a good flow rate through the column.) Stop cock 9 is closed, the column is filled with distilled water to constriction 3 and most of the gel is slurried in. With slight tapping and occasional draw off through stop cock 9 the gel settles until about 25 cc. of effluent contains less than 0.002 milli-equivalents acid to methyl red. The gel is flushed with 25–50 cc. of isopropyl ether just before use. The liquid level is lowered almost to the gel. It is desirable that approximately 25 cc. incremental levels above the gel be marked off and this may conveniently be done the first time the above steps are carried out.

B. INTRODUCTION OF SAMPLE AND ELUTION

A thin-walled bulb containing a 0.10 g. sample of GB is broken and crushed with a glass rod in about 15 cc. of isopropyl ether contained in a 100 cc. beaker. The contents are rinsed into the column, which has been prepared as described in (A) above. The flow is begun and the first 10 cc. of effluent discarded. The next effluent is collected in a 250 cc. iodine flask. As the liquid level descends in the constriction 3 small initial portions of 150 cc. of isopropyl ether are used to rinse the reservoir 5. When the last rinse is descending into constriction 3, the bulk of the elutriant is added and about 130–140 cc. of effluent is collected at 4–9 cc. per minute, controlled by stop cock 9, for GB analysis.

C. IMPURITIES RECOVERY AND COLUMN REGENERATION

The elution is continued and the final small ether effluent is collected for testing. As the ether level descends through the constriction 3 the reservoir 5 is filled with distilled water. When water appears in tube 11, the receiver is changed and two 100 cc. aqueous effluents are collected for "pyrodiester" and free-acid analysis.

Finally, the column is rinsed with an additional 200 cc. of water. It is then ready for the next GB separation.

D. ANALYSIS OF GB IN MAIN ETHER EFFLUENT

To the 130–140 cc. of ether effluent is added 25 cc. of water containing 5–8 drops (0.1–0.2 cc.) of methyl red indicator "A" (0.2% methyl red in ethanol) and not more than one drop (0.03–.05 cc.) of standard 0.1 N NaOH. If upon violent shaking in the stoppered flask the yellow color is not discharged in the ether phase, additional drops of base may be added one at a time with shaking after each drop. The volume of base used is recorded. Twenty cc. of matched 0.1000 N NaOH is then added and the stoppered flask violently shaken two or three times during the next two or three minutes. Twenty cc. of matched 0.1000 N HCl is added and the acid formed by alkaline hydrolysis of GB is titrated, with frequent shaking, to the disappearance of the yellow color in the ether phas. Not moere than 15 cc. of 0.1 N NaOH should be used.

*Calculation*

$$\text{Weight Percent GB} = \frac{\text{Vol. base} \times \text{N base}}{\text{Sample weight in grams}} \times 7.0$$

E. OPTIONAL ANALYSIS OF SMALL ETHER EFFLUENT

This example is analyzed exactly as in the preceding section (D). It contains the ether effluent prior to appearance of the water effluent. Its analysis serves as an indication of the completeness of the GB-pyrodiester separation. It should be completely free of GB, pyrodiester and free acid.

F. ANALYSIS OF PYRODIESTER AND FREE ACID IN WATER EFFLUENT

The water effluent (which must be ether-free to avoid complication of the end points) may be analyzed in two 100 cc. fractions or the two may be combined for one determination.

About 0.2 cc. of an indicator hereinafter termed "indicator B" consisting of 0.05 weight percent methyl red and 0.10 weight percent thymolpthalein in methanol, is added to the sample and the free acid titrated with 0.1000 N NaOH to the methyl red end point.

Twenty cc. of matched 0.1 N base is then added. The blue of thymophthalein should persist or else more base should be used. After standing at least ten minutes, 20 cc. of matched 0.1000 N HCl is added and the acid formed by alkaline hydrolysis of the pyrodiester is titrated with 0.1 N NaOH to the yellow side of methyl red.

*Calculation*

Free acid is determined from the first titration by the usual methods of acid-base analysis.

Pyrodiester is determined from the second titration by the equation:

Weight Percent pyrodiester $$= \frac{\text{Vol. base} \times \text{N base}}{\text{Sample weight in grams}} \times 12.9$$

The effectiveness of the separation is shown by the following example wherein a feed of known composition was employed.

EXAMPLE

A feed was employed consisting of a 20 cc. solution in isopropyl ether containing:

0.280 millimoles GB
0.052 millimoles PDE (pyrodiester)
0.082 milliequivalents free acid A column was prepared as described under (A) above. The feed was then added and subjected to elution first with 160 cc. of isopropyl ether then with 300 cc. of distilled water as described above under (B) and (C).

The elutriants were collected in successive cuts and the individual cuts analyzed as described above. The results are shown in the following table:

| Time | Cut No. | Cut Cc. | Meq. acid Free | Meq. acid By hydrolysis | | Percent on feed GB | Percent on feed PDE | Percent on feed Free acid |
|---|---|---|---|---|---|---|---|---|
| | Isopropyl ether elutriant | | | | | | | |
| | 1 | 20 | 0.001 | 0.004 | | 0.7 | ---------- | 1.2. |
| 10:57 | 2 | 100 | 0.001 | 0.548 | | 97.8 | ---------- | 1.2. |
| 11:01 | 3 | 20 | 0.001 | 0.002 | | 0.4 | ---------- | 1.2. |
| | 4 | 20 | 0.001 | 0.002 | | 0.4 | ---------- | 1.2. |
| 11:10 | 5 | 20 | 0.004 | 0.001 | | 0.2 | ---------- | 4.9. |
| | Water elutriant | | | | | | | |
| | 6 | 100 | 0.087 | 0.166 | | ---------- | 79.8 | 106.2. |
| 11:54 | 7 | 100 | 0.013 | 0.000 | | ---------- | 0.0 | 15.8. |
| | 8 | 100 | 0.006 | 0.000 | | ---------- | 0.0 | 7.3. |
| Total | | | 0.114 | 0.557 | +0.166 | 99.5 | 79.8 | 9.7+129.3. |
| Meq. loss or gain | | | +0.032 | −0.003 | −0.042 | | | |
| Titration error | | | +0.001 | ---------- | | +0.2% | +0.6% | 0.9% per titration. |
| Titration error on feed analysis | | | | | | +0.4% | +1.0% | +2.4%. |

As shown by the above table the first 140–150-cc. gave a 99% recovery of GB containing negligible amounts of free acid. The three 20 cc. effluent cuts following the principal 100 cc. cut contained essentially no GB nor free acid within the limits of the experimental techniques.

The water elution produced an effluent containing free acid and pyrodiester. The loss of pyrodiester was essentially equal to the increase in free acid, indicating that the loss was due to hydrolysis. Eighty percent of the pyrodiester in the feed was recovered.

While I have described a specific apparatus and laboratory scale procedure in detail, it will be obvious that various changes are possible. For example, when used as a purification method, a battery of large columns may be employed which are opened on cycles coordinated so as to permit continuous feed to and discharge from the battery, as is common with extraction apparatus. I therefore wish my invention to be limited solely by the scope of the appended claims.

I claim:

1. A process of separating isopropyl methylphosphonofluoridate from diisopropl pyromethylphosphonate and free acids present as impurities in crude isopropyl methylphosphonofluoridate which comprises introducing said crude product into a column of water-saturated silica gel, and eluting said column with an unsubstituted dialkyl ether having from four to eight carbon atoms.

2. A process as defined in claim 1 wherein said ether is diisopropyl ether.

3. A process of separating isopropyl methylphosphonofluoridate from diisopropyl pyromethylphosphonate and free acids present as impurities in crude isopropyl methylphosphonofluoridate which comprises introducing said crude product into a column of water-saturated silica gel, eluting said column with a lower dialkyl ether, thereby removing said isopropyl methylphosphonofluoridate dissolved in said ether while leaving said impurities in said column, then eluting said column with water therby removing said impurities dissolved in said water and regenerating said column.

4. A process as defined in claim 3 wherein said ether is diisopropyl ether.

5. A process of separating isopropyl methylphosphonofluoridate from diisopropyl pyromethylphosphonate and free acids present as impurities in crude isopropyl methylphosphonofluoridate which comprises dissolving said crude product in a lower dialkyl ether, introducing the solution thereby formed into a column of water-saturated silica gel, eluting said column with further quantities of said ether, thereby removing said isopropyl methylphosphonofluoridate dissolved in said ether while leaving said impurities in said column, then eluting said column with water, thereby removing said impurities dissolved in said ether and regenerating said column.

6. A process as defined in claim 5 wherein said ether is diisopropyl ether.

No references cited.